ly at the right to indicate extent;

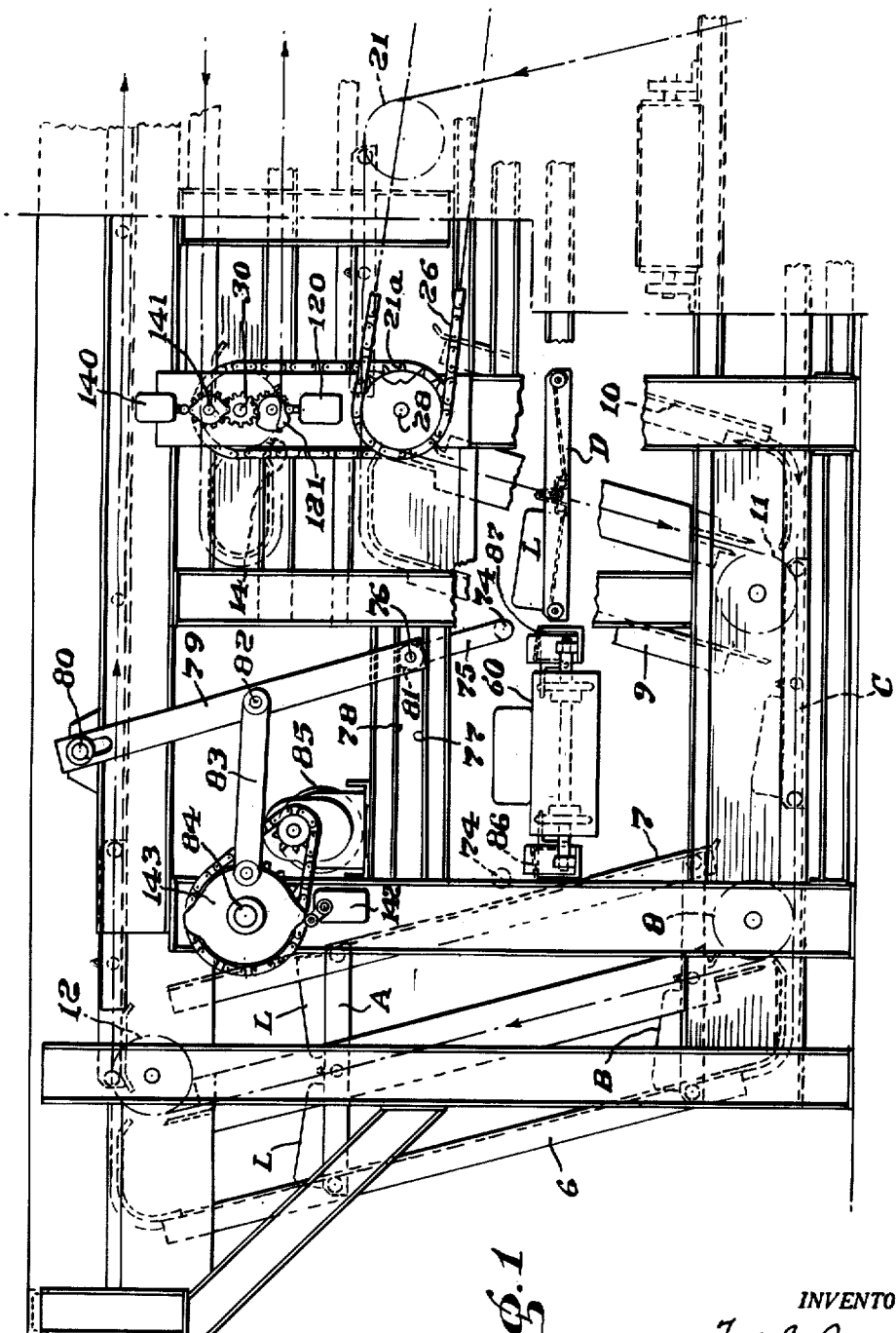

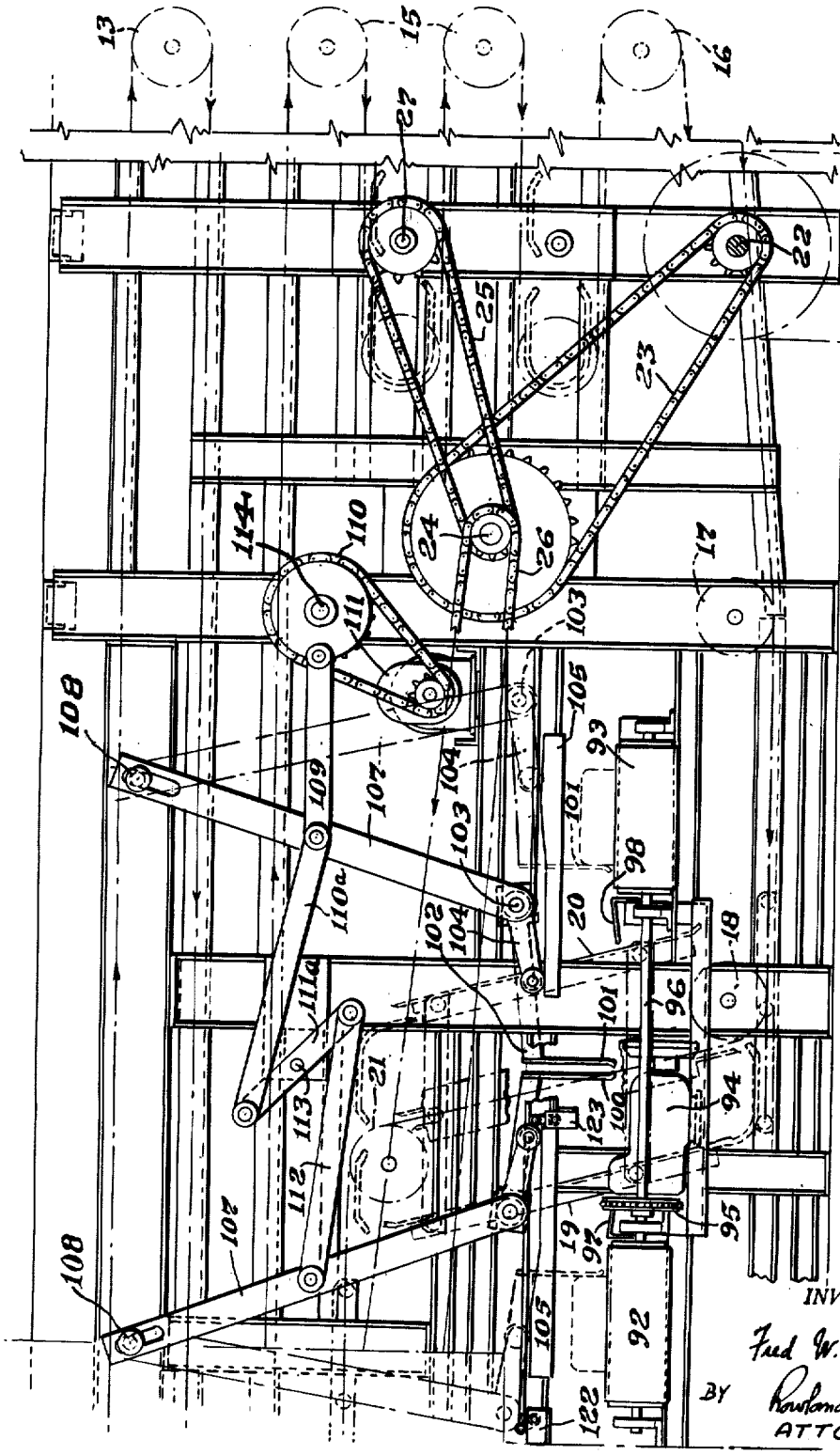

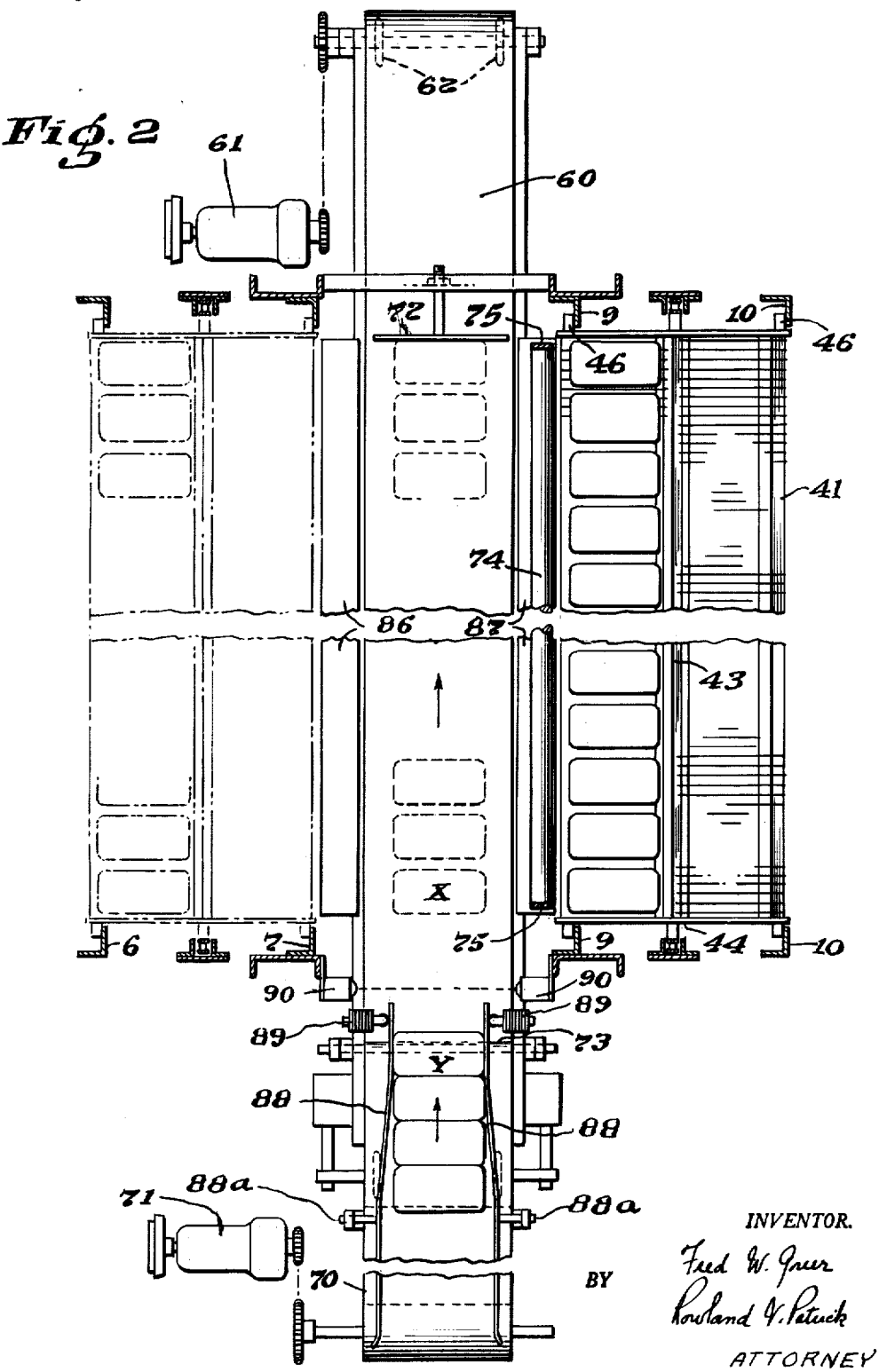

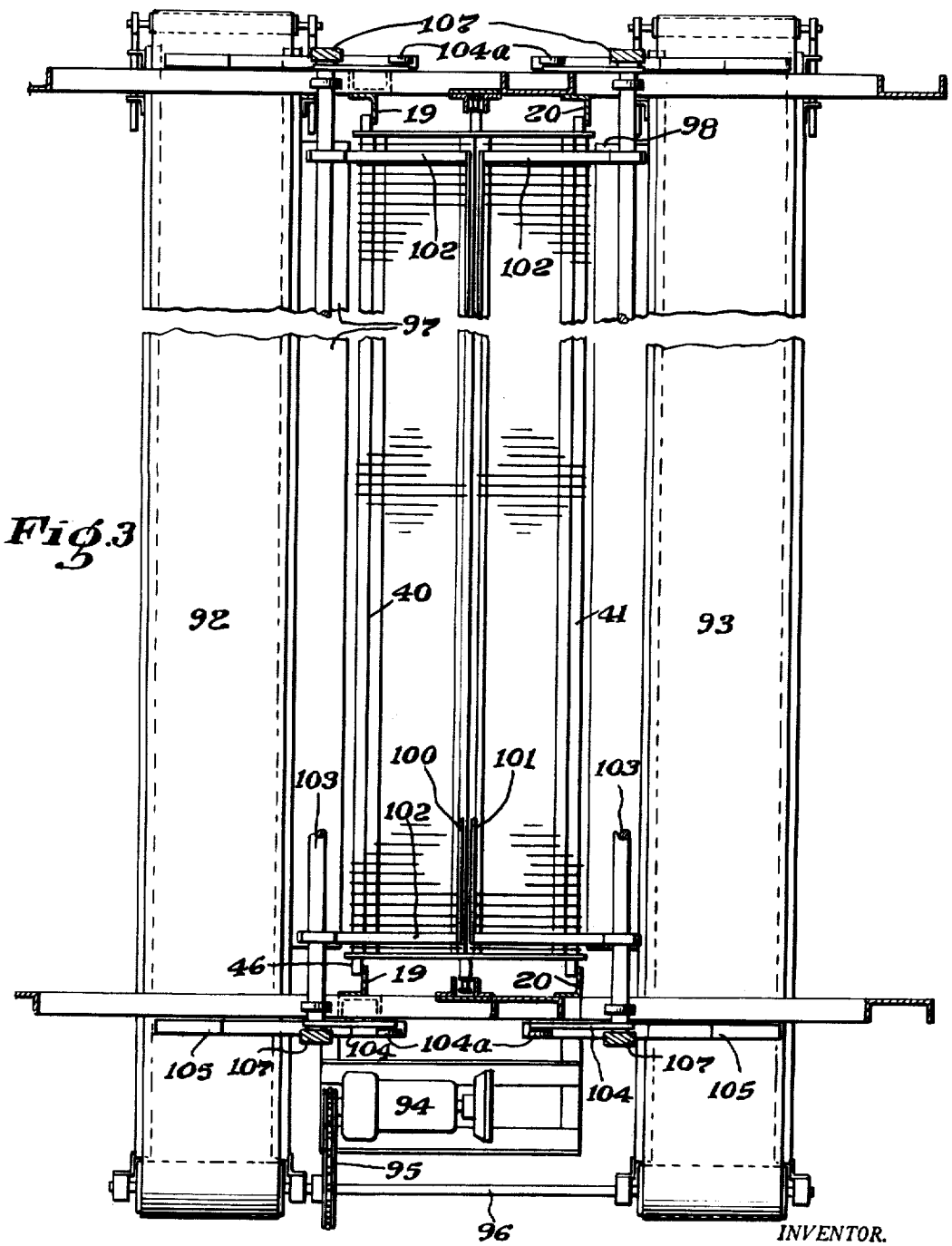

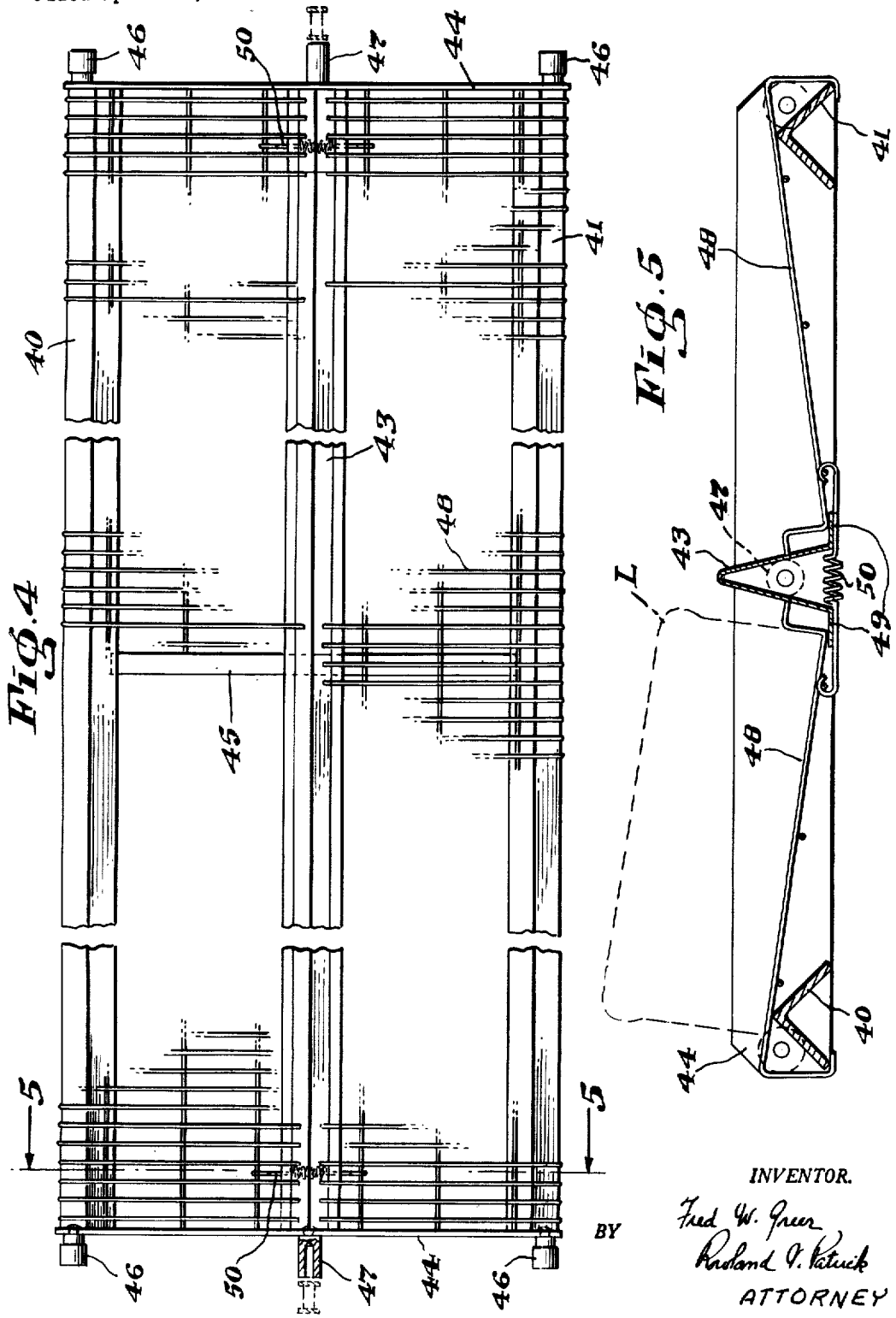

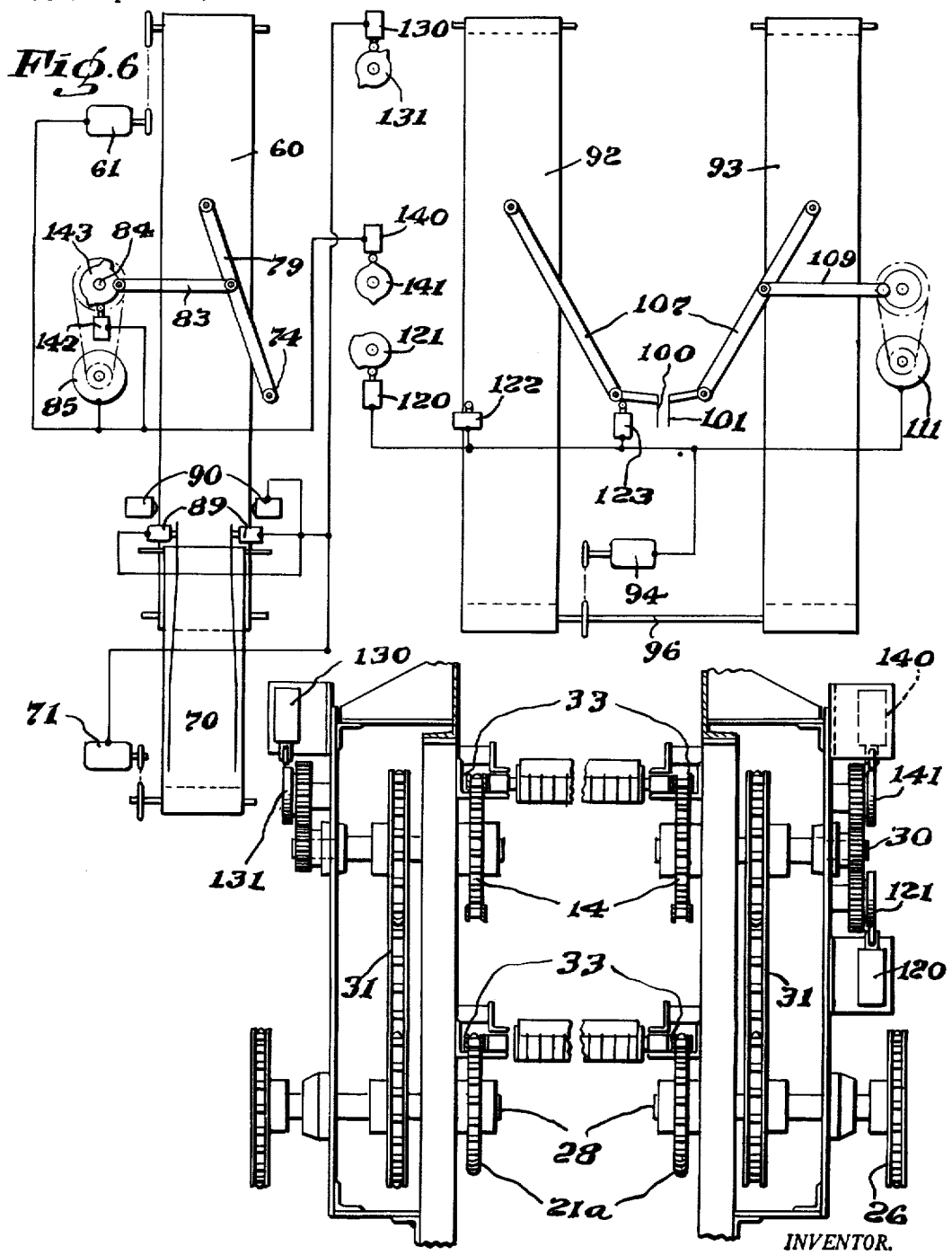

United States Patent Office 2,736,417
Patented Feb. 28, 1956

2,736,417
TRAY CONVEYOR MECHANISM

Fred W. Greer, South Lincoln, Mass., assignor to J. W. Greer Company, Cambridge, Mass., a corporation of Massachusetts Application April 13, 1951, Serial No. 220,927

13 Claims. (Cl. 198—31)

This invention relates to apparatus for grouping articles on conveyors and more particularly to methods for transferring successive groups of independent articles advancing along one conveyor to a plurality of different conveyors. In the preferred form, mechanism is also incorporated for changing the spacing of the articles in the course of their transfer, from relatively close or contacting arrangement on the infeeding conveyor to a greater spacing on another or other conveyors.

Such a mechanism is particularly adapted for use in handling baked goods, specifically bread, between the time the baked goods are dumped hot from the baking pans and the time they are fed to slicing and/or packaging machines.

Good bakery practice requires that bread be cooled before it is sliced or packaged. In the old days, the bread was loaded by hand onto portable racks or shelves where it was left to cool and then removed again by hand. Modern practice favors the use of artificial cooling mechanisms through which the bread is very slowly fed on conveyors most often in the form of a succession of trays mounted on endless chains, so that the bread can pass through a series of horizontal traverses at different levels, the trays being maintained horizontal by guide rails as the conveyor chains, by which the trays are driven, pass around sprockets to drop from one level to the next lower level. Such multi-level superposed traverses save floor space and are ideal for forced air current cooling. These mechanisms sometimes accommodate as many as 8,000 loaves of bread and require one to two hours for a single tray passage from loading to unloading station.

The trays in such coolers have generally been hand loaded and hand unloaded and it is a primary object of this invention to provide automatic loading and unloading operation for such tray coolers so that operation from pan dumping to the final packaging may be completely mechanized. Bread as it comes from the pan is very soft and collapsible, filled, as it is, with hot moist gas. Any severe handling at this stage destroys the loaf shape and renders the loaf an unsalable reject. Any mechanism for feeding the hot loaves into the cooler must take into account the fragile nature of the product and, of course, must be precise, lest the number of rejects from mishandling render the automatic handling more costly than the saving arising from elimination of hand labor.

Apparatus of my invention accomplishes this objective. It handles the loaves gently and accurately, aligning them properly for loading feed in groups.

Most efficient and even cooling requires that the loaves be spaced apart during their traverse in the cooler. My automatic feeder accomplishes this objective, all without rough handling.

In more detail, my invention has several further objects, the first of which is the provision of a novel double-row cooler tray onto which one row of loaves is fed by my feed mechanism while the tray is on one side of a loading conveyor and onto which another row is fed after the tray has moved around to the other side of the same conveyor, both such feeds taking place without interrupting the tray movement, and being successive in time so that the loading conveyor may be reloaded from the infeed conveyor during the period of passage of a one-half loaded cooler tray from one side of the loading conveyor around to the other side.

Transfer of the loaves in groups from the loading conveyor to the trays is accomplished with a common pusher bar, which loads one way over one side of a tray in one motion and loads the other way over the other side of the same or of a different tray on its return motion. It is another object of this invention to time the motion of this bar with relation to the advance of the cooler trays and the operation of the loader conveyor, which advances intermittently, to secure accurate transfer of a row of loaves which have been advanced by the loading conveyor to a proper position for loading, to a properly positioned tray.

It is a further object of the invention to provide gate mechanism for the infeed to the loader conveyor to insure that no loaf will be in the path of the ends of the pusher bar when it operates, a condition that would cause, for reasons hereinafter set forth, a damaged loaf or a jam, such gate mechanism being coupled with an infeed conveyor which feeds loaves to the loading conveyor in groups for positioning of each group as a row on a tray. The operation of the gate mechanism is consistent with careful non-damaging handling.

With respect to the cooler trays, these are designed for convenient disassembly for cleaning purposes, replacement, etc.

Lastly, my unloading mechanism operates to remove the two rows of loaves, after cooling, onto unloading conveyors, which may carry the loaves to slicing or packaging apparatus.

The above and other objects of the invention may be more fully understood in connection with a description of an apparatus of the invention particularly designed for handling standard size bread loaves illustrated in the accompanying drawing wherein:

Fig. 1 is an elevational view of the left-hand portion of the apparatus, omitting the infeed conveyor shown in other figures, and having certain parts of the framework broken away for purposes of clarity;

Fig. 1a is a similar view of the right-hand portion of the apparatus, broken away vertically at the right to indicate extent;

Fig. 2 is a plan view of the infeed and loading mechanism at the loading station;

Fig. 3 is a plan view of the unloading mechanism at the unloading station;

Fig. 4 is an enlarged detail plan view of one of the cooler trays, broken away to indicate extent;

Fig. 5 is a cross-sectional view taken along the lines 5—5 of Fig. 4, indicating in dotted lines the position of a loaf of bread in cooling position thereon;

Fig. 6 is a line diagram of the timing mechanism; and

Fig. 7 is a side elevational detail, broken away centrally to indicate extent, of the drive mechanism.

The apparatus comprises an extensive open-work frame across which extend a series of article conveying trays which are centrally pivoted at their ends on parallel endless sprocket chains, which are just inside the front and the back framework. The chains pass over sprocket wheels at intervals to change the direction of movement of the trays so that their center lines follow the path indicated by the arrowed lines.

Suitable runways are positioned on each side of the tray path at certain places in order to aid in guiding the trays and maintain them in a horizontal position throughout their travel, part of which is along non-horizontal inclined traverses.

In order to trace this travel, one may start at a point near the upper left-hand corner in Fig. 1, where the end of tray A is shown. At this point the tray is travelling in an upwardly inclined direction between guide rails 6 and 7. Its immediately following tray is shown near the bottom of this traverse at B. The tray following B is shown in dotted lines at C, not yet having passed beyond lower left-hand corner sprocket 8. The next tray D is travelling in a downwardly inclined direction between guide rails 9 and 10, not yet having passed around sprocket 11. Tray D is at the first loading station; having just been loaded with one row of loaves L. Tray A has just passed the second loading station and, therefore, as shown, carries two rows of loaves L. From the point of fully loaded tray A shown in Fig. 1, the trays follow a path by upper left-hand sprocket 12, thence to the right-hand extremity of the machine, by a sprocket 13 (upper right-hand corner of Fig. 1a), thence in a zig-zag fashion by sprockets 14 (Fig. 1) and a series of sprockets 15, down to sprocket 16, thence back at the lowest level by sprockets 17 and 18 and into upwardly inclined unloading traverse between guide rails 19 and 20 by sprockets 21, then 21a (Fig. 7) and back to the position of tray D for reloading.

The travel of the trays is uniformly continuous from a main drive shaft 22 (Fig. 1a) which by a sprocket chain 23 drives shaft 24 which, in turn, is connected by right- and left-extending sprocket chains 25 and 26, respectively, to shafts 27 (Fig. 1a) and 28 (Figs. 1 and 2).

As shown in Fig. 7, shaft 28 carries the two sprocket drive wheels 21a and is interconnected by front and back chains 31 with an overlying shaft 30, which likewise carries the two sprocket drive wheels 14 for driving the tray conveyor chains 33 at the earlier higher level.

It should be understood that suitable portions of the apparatus may be enclosed and/or insulated for the purpose of directing or confining forced air cooling, though such enclosures are omitted for the purpose of clarity.

The apparatus as so far described is built in accordance with conventional cooling conveyor construction, except for the particular path of the trays at the loading and unloading stations.

However, the trays themselves are of novel construction as will be most clearly understood by referring to Figs. 4 and 5. Each tray comprises a framework constituted of two inverted large angle irons 40 and 41 and a central A-shaped member 43. These three pieces are held in spaced relation by end strips 44 and any number of intermediate transverse bars 45 required, depending upon the dimensions of the tray. End pieces 44 have suitable pins supporting idler rollers 46 for engagement with guide rails and suitable connections 47 for mounting the trays on the conveyor chains 33.

As shown in Fig. 5, the central member 43 divides the tray medially, and the bread-supporting surfaces are provided with two separate grids 48, formed of wire mesh or other stiff reticulated material. Each grid is shaped so that it will rest on the framework in a position inclined downwardly towards the central member 43. At their outer edges, the grid-forming elements are therefore bent over into hook-shape as shown in Fig. 5, and at their inner edges are bent upwardly and inwardly so that they rest both upon the base flanges 49 and against the side portions of the central member 43, and provide inner abutments to engage the inner ends of the loaves of bread L while they are carried on the tray. As shown, the outer grid edge portions are hooked around the inverted angle irons 40 and 41 respectively.

The grids 48 are fastened in these positions by two or more spring clips 50, Fig. 5, which extend beneath the central member 43, their ends being hook-shaped so that the hooks may be detachably passed around wires of the two separate grids to yieldingly hold the two grids inwardly and downwardly on the tray framework. This type of assembly is extremely convenient when it comes to cleaning or repairing the grids, as they may be readily removed merely by unfastening the spring clips 50.

The complete loading of each tray as hereinbefore stated takes place at two stations, so that one grid of the tray is loaded from one side of central tray member 43 and the other grid of the tray is loaded from the other side of the tray. This is the purpose of having the generally U-shaped tray path apparent in Fig. 1 and previously described; for within the U, there extends transversely with respect to the tray path, an endless conveyor loading belt 60, shown in plan in Fig. 2.

This belt is driven from an independent driving motor 61, and extends from a driving pulley 62 at the back of the apparatus through the apparatus to the front where it is overlapped by an infeed conveyor belt 70 driven from an independent motor 71, and which doubles back at a small radius around a roller at 73.

At the back of the apparatus, a stop member 72 is suspended from the frame across the path of travel of bread carried by the loading conveyor 60. In order to sweep bread from conveyor 60 onto the trays, there is provided a sweep pusher bar 74, only slightly less in longitudinal dimension than the trays. Bar 74 is connected at its ends to two parallel links 75. At the front end, link 75 is hung rigidly from a rod 76 (Fig. 1) which extends outwardly through parallel spaced cam tracks 77 and 78 and has connected to its outer end an arm 79 extending upwardly to a pin and slot pivotal connection at the top of the frame 80. The rod 76 carries a sleeve functioning as a cam roller 81 bearing on cam tracks 77 and 78. The arm 79 is pivotally connected at 82 to a crank 83 mounted on shaft 84 journalled in the frame. These parts, except the shaft, are duplicated at the back of the apparatus. Shaft 84 is driven by a motor 85 through sprocket wheels and chain drive.

Rotation of shaft 84 thus oscillates arm 79, which motion, by reason of the slot connections at 80 and cam tracks 77 and 78, is converted into a reciprocating travel of bar 74 from its full line to its dotted line position as shown in Fig. 1, during which travel it sweeps transversely across belt 60 to push ahead of it any bread which lies on conveyor 60 in the path of bar travel. Thus, in Fig. 1, bar 74 has just completed its motion to the right to push a row of loaves into tray D. It rests in that position, as will be hereinafter described, until tray B has progressed upwardly to a position indicated in dotted lines in Fig. 2 to receive its other row of bread during return sweep motion of bar 74. Meanwhile, conveyor 60 which is stopped while bar 74 is in motion will have restarted to move an additional row of bread into position to be swept by bar 74 in its return motion onto tray B. Suitable stationary bridges 86 and 87 span the gap between conveyor 60 and the tray path.

It will be noted in Fig. 2 that bread in loading position on conveyor 60 is spaced whereas bread on infeed conveyor 70 is in side to side contact. Such spacing is accomplished merely by having conveyor 60 operate with greater travel speed than conveyor 70. However, the matter is not quite as simple as this because of the danger that conveyor 60 will be stopped at a time when a loaf or a portion thereof straddles the entry end of the path of pusher bar 74. This may readily happen because of random spacing on infeed conveyor 70 or because when conveyor 70 stops, a loaf may be half-way on conveyor 60 and continue on even though conveyor 70 has stopped. If there is such a straddling, that loaf will almost certainly be crushed against the end of the tray B. Such an eventuality is precluded by the inclusion of a gate mechanism which insures that any loaf which is not within a certain distance of the tray end at a predetermined time before conveyor 60 stops, will be delayed at least sufficiently long to insure that it will not reach the tray end before the conveyor 60 stops.

This gate mechanism comprises a pair of opposed flexible spring sheet metal grippers 88, one on each side of the path of travel, which converge towards each other near the end 73 of infeed conveyor 70 and extend over the end of loading conveyor 60. They are suspended from brackets 88a and their inner ends are free to move towards and away from each other to grip a loaf such as that indicated at Y in Figure 2. They are moved together by solenoids 89 which are energized at the proper time through a circuit to be hereinafter described, which includes photocell units 90 mounted on the frame to scan transversely the path of bread movement just beyond the ends of the grippers 88. The grippers return at the proper time as will be later described, by their own resiliency, to permit free bread passage.

Figs. 1a and 3 show the unloading station which is disposed in an upwardly inclined traverse of the tray conveyor where the trays run between tracks 19 and 20.

While the tray loading is done successively at two loading stations in the tray path, the unloading of both rows of bread is done simultaneously at one station. For this purpose, I provide two unloading conveyor belts 92 and 93, one on each side of the path of tray travel at the unloading station. These belts are shown in plan in Fig. 3 and are driven by a motor 94 through sprockets and sprocket chain 95, and shaft 96 bearing belt pulleys over which the conveyor belts 92 and 93 run, as shown. Stationary bridges 97 and 98 span the space between the tray path and conveyor path so that the bread rows can be passed from the trays to the conveyors. This bread movement in rows is accomplished with two scoops 100 and 101 which are slightly less than coextensive in length with the trays, and which are mounted for movement from their dotted line positions outside of the tray path and over conveyors 92 and 93, respectively, as shown in Fig. 1a, to their full line positions shown in Figs. 1a and 3, near the center of the tray path. In order to insure clearance of these scoops in their motion with respect to the continuously rising tray, they have an inclined motion imparted by the following mechanism which is duplicated front and back. Each of the scoops is hung (Fig. 1a) between ends of parallel arms 102. The other ends of arms 102 are fast on rods 103 which extend outwardly beyond the frame and carry cam arms 104. The adjacent ends of cam arms 104 carry cam rollers 104a which bear against fixed cams 105. Pivotally mounted at the outer ends of rods 103 are levers 107 extending upwardly to pin and slot connections to the frame at 108. The right-hand set of levers 107 are oscillated by a crank 109 driven through a sprocket drive 110 by a motor 111.

The left-hand pair of levers 107 are driven by reversing link connections to the crank 109 through links 110a, 111a and 112, link 111a being pivoted on the frame centrally at 113. Drive shaft 114 extends across the framework to drive the duplicate crank 109 in the rear of the machine.

The scoops thus reciprocate along inclined paths determined by the shape of the stationary cams 105 to scoop bread quickly, while the tray is moving, off the tray, one row each side across the bridges 97 and 98 onto the conveyors 92 and 93.

The main cooling conveyor drive is continuous but slow.

As previously described, four other motors are provided—infeed conveyor motor 71 (Fig. 2), loading conveyor motor 61 (Fig. 2), unloading conveyor motor 94, loading pusher bar motor 85 (Fig. 1) and unloading scoop motor 111 (Fig. 1a). Each of these motors is provided with automatic braking mechanism. These motors are shown diagrammatically in the line drawing of Fig. 6.

The unloading scoop motor 111 is started and stopped by the tripping of a microswitch 120 also shown in Fig. 1a (upper right), by a cam 121 gear operated from shaft 30 (which doubles as a tray drive and timing shaft [Figs. 1a and 7]), in synchronism with the main drive shaft as dictated by the spacing of the trays. Starting from the position shown in Fig. 6, motor 111 starts when a loaded tray has risen in its path of travel to a position such that the scoops 100 and 101 are behind the loaf rows. The scoops move quickly outwardly until the motor is stopped by engagement of one of the arms with a limit switch 122. The scoops pause in this position to permit the tray to pass on up, but after the tray is out of the way the cam 121 starts the motor 111 to return the scoops 100 and 101 to the position shown in Fig. 6 awaiting the next loaded tray. The motor 111 is stopped on the return movement by limit switch 123. Conveyor belts 92 and 93 are placed in motion by motor 94 whenever scoops 100 and 101 are moving apart.

The loading timing is more complicated. Feed belt motor 71 is controlled by a microswitch 130 mounted at the back of the machine and tripped by a cam 131 (Fig. 7) also geared to timing shaft 30. It is designed to permit motor 71 to operate a certain distance to advance to loading conveyor 60 that number of loaves which are side by side on conveyor 70 which constitute one row of spaced loaves on the tray; and then stop to make a space before the next group of loaves is fed to conveyor 60. In addition, conveyor 70 makes a second pause, co-extensive with a stoppage of conveyor 60 while pusher bar 74 operates.

Loading conveyor motor 61 is started and stopped by a microswitch 140 actuated by a cam 141, geared to timing shaft 30 at the front of the apparatus as shown in Fig. 7, in timed relation to the tray travel so that it operates for a large portion of the time during which a tray just loaded advances a distance equal to one-half the spacing between trays—thus conveyor 60 becomes reloaded twice every full tray advance.

Motor 85 for pusher bar 74 is also operated by switch 140, starting every time conveyor motor 61 stops, but motor 85 is stopped by a switch 142 actuated by a cam 143 carried by pusher bar crank shaft 84.

Crank 83, therefore, sweeps bar 74 one direction when conveyor 60 stops, pauses while conveyor 60 moves, and then sweeps bar 74 back the next time conveyor 60 stops and then pauses, and so on.

If full tray rows are desired, the group spacing pause of belt 70 must be timed to allow the last loaf of a group delivered to belt 60 to be moved from the beginning of belt 60 to the position of loaf X (Fig. 2) before belt 60 is stopped. In other words, the group spacing is caused by a belt 70 pause in advance of its final pause, co-extensive with stoppage of belt 60, for pusher bar sweep. Hence, when belt 60 stops for pusher bar sweep, the first loaf of the next group can be on belt 60 just to the left, as shown in Fig. 2, of the pusher bar 74 sweep path, and ready, when both belts resume operation after pusher bar sweep, to advance to stop member 72 with the shortest possible travel.

Tied into the circuit to motor 71 is the gate mechanism previously described, in such manner that if switch 130 is in the off position (i. e. with motor 71 of infeed conveyor 70 stopped), and the path of light of the photocell scanning mechanism 84 is not broken by an intervening loaf, solenoids 83 will be actuated to stop the next loaf from advancing further on loading conveyor 60. However, so long as either one of the conditions (a) conveyor 70 running, or (b) bread interrupting the scanning vision prevails, solenoids 83 will not be energized. If conveyor 70 is running and bread interrupts the scanning vision, the gate mechanism will not close until after the light interrupting loaf has passed on and then will operate only if conveyor 70 has stopped. Thus, during the bread-spacing pause of belt 70, bread on conveyor 60 will continue to advance, but the gate will prevent any bread which has not reached the scan line before the belt 70 pause from further advance until belt 70 resumes operation.

In operation, the tray conveyor is started and at a proper point in the tray movement, conveyors 70 and 60 will simultaneously start by reason of operation of timing cams 131 and 141 respectively. Bread dumped from the baking pans is then placed by hand on conveyor 70 in such a manner that it is generally in side by side position. Assuming for the moment that the bread has just reached the end of conveyor 70 when conveyor 70 stops. After an interval, the conveyor 70 will start again and continue to feed loaves onto conveyor 60 until say fourteen loaves pass onto the conveyor 60. Since conveyor 60 is operating faster than conveyor 70, the loaves will be spaced from one another as indicated in dotted lines in Fig. 2. Conveyor 70 then stops to make a greater space between the fourteenth and fifteenth loaves. Conveyor 60 continues to operate so that the last loaf of the group of fourteen will be carried beyond the entry end of the trays before the conveyor 60 stops. At that time, the first loaf of the group of fourteen will have just reached the stop 72. Both conveyors 60 and 70 then stop while pusher bar motor 85 starts to sweep pusher bar 74 across belt 60 to sweep the fourteen loaves onto the descending tray to the right of conveyor 60. The pusher bar 74 stops in its right-hand position. Conveyors 70 and 60 then again start simultaneously to reload conveyor 60 with the remainder of the next group of fourteen loaves into proper position for sweeping, motor 85 is restarted and by this time a tray has arrived at the left-hand of the conveyor belt 60 in a position to receive the second group of loaves. Thus, the loading mechanism operates to load fourteen loaves alternately, first on the tray on one side and then on the tray on the other side.

The photocell mechanism 90 operates to insure that the proper space has been left between groups, so that when conveyor 60 stops, there is positive assurance that no loaf will straddle the end of pusher bar 74. In the form shown, the scan line is so spaced from the inner end of the gate mechanism that if a loaf inadvertently starts onto moving conveyor 60 while conveyor 70 is stopped for the loaf-grouping pause, the gate will frictionally grip it if and when the preceding loaf has passed the scan line, until conveyor 70 starts again, at which time it will be immediately released and will thus be the first loaf in the next group, properly spaced. Meanwhile, the conveyor 60 frictionally passes under the held loaf during the small period of time.

Meanwhile, the unloading mechanism operates entirely independently each time a loaded tray approaches the unloading station, the conveyor belts 92 and 93 starting whenever the scoops 100 and 101 reach their outer extreme positions of movement over the belts 92 and 93 and stopping whenever the scoops 100 and 101 start to scoop outwardly.

I have thus provided a wholly automatic loading and unloading machine for a slowly operating unit-type conveyor.

I claim:

1. In combination with a conveyor mechanism having a series of trays suspended in spaced relation to one another and driving means for advancing said trays along an endless path, including a U-shaped portion having non-horizontal legs, and guide means for maintaining each of said trays in horizontal position as they advance along said non-horizontal legs, a horizontal cross-conveyor extending beside and transversely of said tray path between the non-horizontal legs of said U-shaped portion to form a loading station, and transferring means for transferring articles from said cross-conveyor at the loading station over one side of a tray as it passes through the loading station along one leg of the U and over the other side of the tray as it passes through the loading station along the other leg of the U.

2. The combination of claim 1 with conveyor mechanism having drive means for advancing said tray conveyor uniformly and continuously.

3. Conveyor mechanism as claimed in claim 1, wherein the transferring means includes a pusher bar and drive means for alternately sweeping said bar across said cross conveyor first one way to load a tray at the loading station in one leg of the U and then the other way to load a tray at the loading station in the other leg of the U.

4. Conveyor mechanism as claimed in claim 3, including means for intermittently operating the cross-conveyor and wherein the drive means sweeps the pusher bar across the cross-conveyor while said cross-conveyor is stopped.

5. In combination with a conveyor mechanism having a series of trays suspended in spaced relation to one another and driving means for advancing said trays along an endless path, including a U-shaped portion having non-horizontal legs and another non-horizontal portion, and guide means for maintaining each of said trays in horizontal position as they advance along said non-horizontal path portions, a horizontal cross conveyor extending beside and transversely of said tray path between the non-horizontal legs of said U-shaped portion to form a loading station, horizontal conveyors extending beside and transversely of said tray path on each side of said other non-horizontal portion to form an unloading station, transferring means for transferring articles from said cross-conveyor at the loading station over one side of a tray as it passes through the loading station along one leg of the U and over the other side of the tray as it passes through the loading station along the other leg of the U, transferring means for transferring articles carried by said trays as they pass through said unloading station off said trays over both sides of said trays onto said unloading station horizontal conveyors and means for actuating said loading station transferring means and said unloading station transferring means in timed relation with said tray advancing driving means.

6. Conveyor mechanism as claimed in claim 5, wherein the trays are adapted to carry two rows of articles and wherein the unloading transferring means comprises two scoops and means for cyclically operating said scoops as each tray passes through said unloading station to scoop one row of said articles from said tray onto one of said unloading conveyors and to scoop the other row of articles simultaneously from said tray onto said other unloading conveyor.

7. The combination claimed in claim 5, wherein the transferring means at the loading stations transfers a row of articles from the horizontal cross-conveyor between the legs of the U first onto one side of a tray as it passes along one leg of said U and then transfers another row of articles from the same cross-conveyor onto the other side of said tray as it passes along the other leg of said U, and wherein, the transferring means at the unloading station unloads each row from the trays over the respective side of the tray over which it was loaded.

8. Conveyor mechanism comprising an endless conveyor, a second endless conveyor abutting the end of the first conveyor for receiving articles advanced along said first conveyor, drive means for simultaneously starting said conveyors cyclically, timing means for stopping said first conveyor before said second conveyor stops, whereby a continuous succession of articles carried by said first conveyor and transferred to said second conveyor are positioned, when said second conveyor stops, in a group spaced from the next article to be advanced when the conveyors simultaneously resume advance.

9. Conveyor mechanism as claimed in claim 8, wherein the drive means advances said second conveyor at a faster surface speed than the first conveyor for additionally automatically spacing individual articles of each group on said second conveyor.

10. Conveyor mechanism as claimed in claim 8, having mechanism for sweeping articles in said spaced group off said second conveyor while both said conveyors are stopped and before they simultaneously resume advance.

11. Conveyor mechanism as claimed in claim 10, having gate mechanism for retarding movement of articles on the second conveyor, and means for operating said gate mechanism to retard any article which has not reached a certain line of advance on said second conveyor within a predetermined time in advance of the cyclical stopping of said second conveyor, whereby no article will straddle the end of the sweeping mechanism when said second conveyor stops.

12. Conveyor mechanism comprising an endless conveyor, a second endless conveyor abutting the end of the first conveyor for receiving articles advanced along said first conveyor, drive means for intermittently operating both of said conveyors, said drive means driving said second conveyor at a faster surface speed than that of said first conveyor for automatically increasing the space between articles advanced by the first conveyor, and timing means for stopping said first conveyor while said second conveyor continues to advance to periodically further increase the space between one group of advancing articles and the next following article, a gate for holding an article on the second conveyor to retard its normal movement therewith, and means for actuating said gate to hold any article which has not reached a certain line of advance on said second conveyor within a predetermined time in advance of the cyclical stopping of said second conveyor.

13. Conveyor mechanism as claimed in claim 12, wherein the gate actuating means includes a photocell scanning the path of advance of articles on said second conveyor at said line, said means actuating said gate only when said first conveyor is stopped and when the scan line of said photocell is uninterrupted.

References Cited in the file of this patent

UNITED STATES PATENTS

| | | |
|---|---|---|
| 834,037 | Arthur | Oct. 23, 1906 |
| 847,147 | Arthur | Mar. 12, 1907 |
| 1,109,894 | Baker | Sept. 8, 1914 |
| 1,133,565 | Kankkonen | Mar. 30, 1915 |
| 1,319,190 | Van Houten | Oct. 21, 1919 |
| 1,514,362 | Baker et al. | Nov. 4, 1924 |
| 1,842,912 | McNamara | Jan. 26, 1932 |
| 1,885,494 | Ulmann | Nov. 1, 1932 |
| 1,904,613 | Braren | Apr. 18, 1933 |
| 2,428,722 | Palmer | Oct. 7, 1947 |
| 2,439,657 | Hexter et al. | Apr. 13, 1948 |
| 2,442,250 | Spain | May 25, 1948 |
| 2,558,774 | Nordquist et al. | July 3, 1951 |
| 2,575,278 | Kearney | Nov. 13, 1951 |

Disclaimer 2,736,417.—*Fred W. Greer*, South Lincoln, Mass. TRAY CONVEYOR MECHANISM.
Patent dated Feb. 28, 1956. Disclaimer filed Feb. 15, 1957, by the inventor; the assignee, *J. W. Greer Company*, consenting.
Hereby enters this disclaimer to claims 8, 9, and 10 of said patent.
[*Official Gazette March 19, 1957.*]